United States Patent [19]

Alder

[11] Patent Number: 4,702,041

[45] Date of Patent: Oct. 27, 1987

[54] PREVENTION OF FOREIGN MATERIAL INTRUSION IN AN AIR SLIDE FOR MACHINES

[75] Inventor: Meryle D. W. Alder, Corning, N.Y.

[73] Assignee: Corning Glass Works, Corning, N.Y.

[21] Appl. No.: 883,743

[22] Filed: Jul. 9, 1986

[51] Int. Cl.[4] ............................................. B24B 41/02
[52] U.S. Cl. ............................ 51/165.71; 384/9; 384/12; 51/55
[58] Field of Search ................ 384/9, 12, 15; 51/55, 51/165.71, 165 TP

[56] References Cited

U.S. PATENT DOCUMENTS

| | | | |
|---|---|---|---|
| 1,171,174 | 2/1916 | Corry | 51/55 |
| 1,525,336 | 2/1925 | Svensson | 51/55 |
| 3,466,951 | 9/1969 | Greenberg | 384/12 |
| 3,494,673 | 2/1970 | Wilcox | 384/15 |
| 3,717,392 | 2/1973 | Ennis | 384/12 |
| 4,068,413 | 1/1978 | Suddarth | 51/55 |
| 4,114,959 | 9/1978 | Christ | 384/12 |
| 4,481,023 | 11/1984 | Marechal et al. | 65/64 |
| 4,504,048 | 3/1985 | Shiba | 384/12 |
| 4,569,562 | 2/1986 | Sato | 384/12 |

FOREIGN PATENT DOCUMENTS 0011331  2/1979  European Pat. Off. .......... B29/D11

OTHER PUBLICATIONS

"Moore Precision Turning and Grinding Machines", Moore Special Tool Co., Inc. 1985.

Primary Examiner—Harold D. Whitehead
Attorney, Agent, or Firm—Woodcock, Washburn, Kurtz, Mackiewicz & Norris

[57] ABSTRACT

A machine for grinding the cavity in a mold for optical lenses has a spherical grinding tool which is precisely positioned with respect to a predetermined reference by air slides which move the tool in orthogonal directions. The carriages of the air slides move relative to center rails. A film of air between the top plate of each air slide and the center rail is supplied from a first source at a pressure which supports the weight of the carriage. When precise alignment is obtained, the first air supply is cut off to lock the air slides in the position of alignment. A recess in end portions of the top plate has air holes communicating therewith which are supplied from air from a second source. The flow of air from this second source is continuous and is sufficient to prevent foreign material from entering the air slide.

18 Claims, 7 Drawing Figures

PREVENTION OF FOREIGN MATERIAL INTRUSION IN AN AIR SLIDE FOR MACHINES

BACKGROUND OF THE INVENTION

This invention relates to a machine for shaping a workpiece and more particularly, to an improved air slide for precisely determining the relative position between a grinding tool and the holder for a workpiece.

Precision optical elements may be formed in molds having a precise configuration. U.S. Pat. No. 4,481,023 Marechal and Maschmeyer describes the molding of a glass lens having dimensional tolerances finer than 0.1% and surface figure tolerances finer than 0.2 λ/cm in the visible range of the radiation spectrum. The molds for forming such lenses must have a very precise configuration.

The mold must have a good surface finish, be inert to the glass, and have sufficient rigidity to retain the surface figure at pressing temperature. Mold materials which are suitable for use include 400 series stainless steels, electroless nickel, beryllium nickel alloys, tungsten carbide, alloys of noble metals such as platinum, rodium, and gold, and fused silica.

Heretofore, some such molds of specific composition have been fabricated by a point diamond turning operation, as disclosed in European Patent Application Publication No. 0011331. However, harder materials such as stainless steels cannot be fabricated into molds by single point diamond turning machines.

It is an object of the present invention to provide a grinding machine which can be used to fabricate work pieces, such as molds, from very hard materials such as stainless steels, tungsten carbide and ceramics.

It is another object of the present invention to prevent the intrusion of foreign material into an air slide which is used to position a tool.

RELATED APPLICATION

AIR SLIDE POSITIONING FOR GRINDING SPINDLES, Adler, Ser. No. 883,744, filed July 9, 1986, (CTZ-6, D-10,040) describes an air slide with two independent air supplies, one of which is cut off to lock the air slide in position.

SUMMARY OF THE INVENTION

The relative position between a grinding tool and a predetermined reference is accurately determined by air slides which move in orthogonal directions one to the other. These air slides are driven by linear actuators which move the carriages of the air slides in small precise increments. Air is supplied between an upper plate of the carriage and a center rail on which the carriage rides at a pressure sufficient to overcome the force generated by the weight on the carriage. The tool must be accurately located within very close tolerances.

As described in the above-mentioned Adler application, when the grinding tool is positioned in precise alignment with its reference, an air supply is turned off to lock the air slide in the alignment position. In accordance with the present invention, foreign material is prevented from entering the air slide by independently supplying air via holes communicating with a recess formed in opposite ends of a top or upper plate of the air slide. The recess has a clearance above the rail, on which the carriage rides, which is sufficient to prevent the formation of an air bearing. In this manner, the tool may be locked in position by turning off a first air supply, while maintaining a flow of a second air supply to such recesses sufficient to prevent liquid or other foreign contaminants from entering the air slide.

During the grinding operation, a continuous stream of a liquid coolant and/or lubricant is supplied to the workpiece to facilitate good machining. When the air slide is clamped, that is the air pressure between the top plate and the rail is cut off, the air slide is susceptible to "wicking". "Wicking" is the intrusion of liquid between the top plate of the carriage and the rail caused by capillary action. This draws liquid into the air slide bringing with it contaminants and foreign matter which adversely affect the operation of the air slide. In accordance with the present invention, air will always blow out around the periphery of the top plate of the carriage in order to prevent wicking. It is understood that air is continuously supplied between the center rail and the side and bottom plates to prevent contamination due to wicking, which air supply is manifolded to the holes communicating with the recesses in the top plate.

The improved air slide of the present invention makes the machine particularly suitable for the precise control which is necessary to achieve the grinding of molds for optical lenses as described in the aforementioned Marechal and Maschmeyer patent, by preventing contamination of the precise air slides.

The foregoing and other objects, features, and advantages of the invention will be better understood from the following more detailed description and appended claims.

SHORT DESCRIPTION OF THE DRAWINGS

DESCRIPTION OF THE PREFERRED EMBODIMENT

Figure 1:
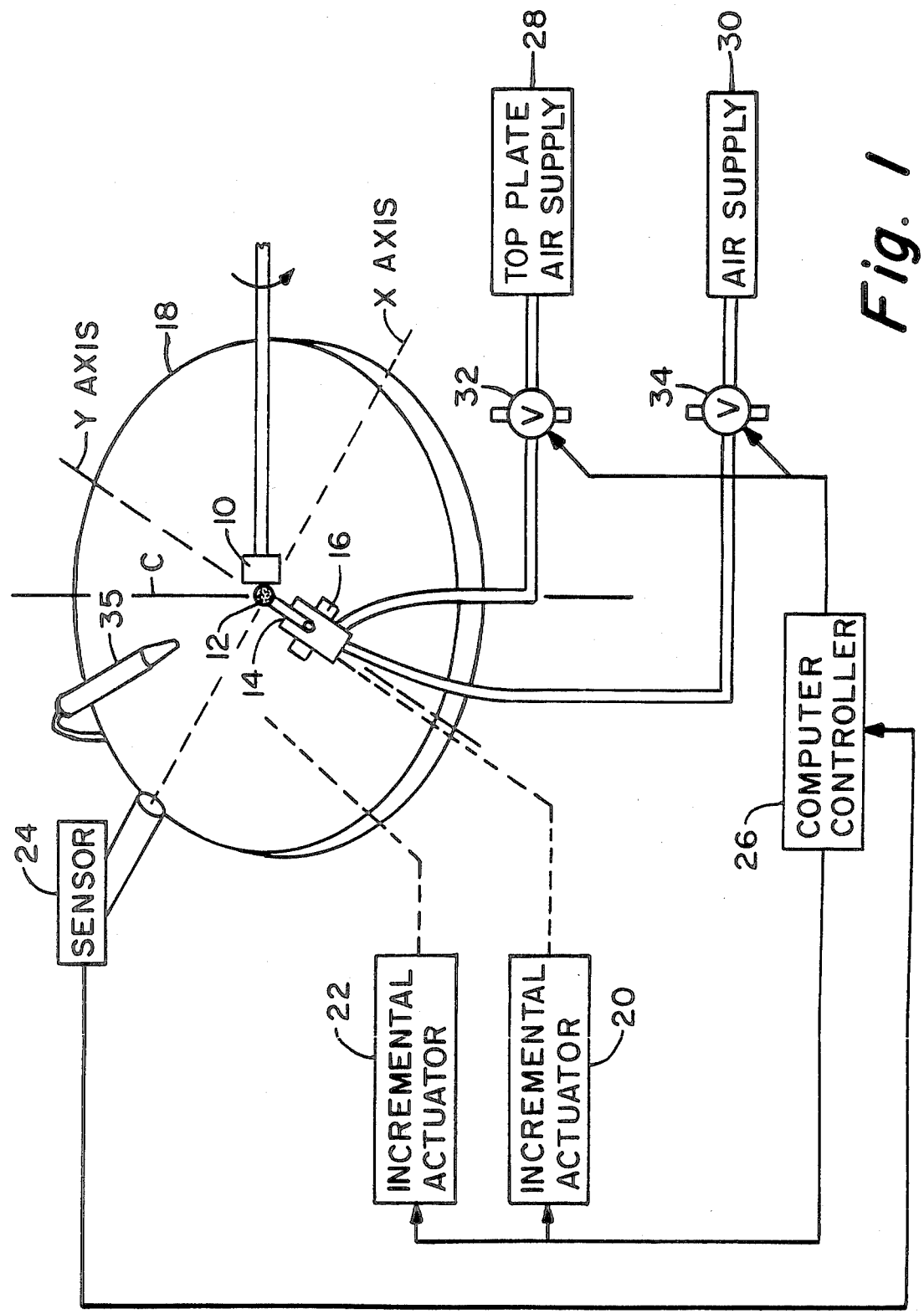
FIG. 1 is a schematic view of the machine of the present invention.

FIG. 1 schematically shows the machine of the present invention for forming a cavity in a workpiece which may be a mold for optical lenses. The workpiece is held in holder 10 mounted on a rotating spindle. A spherical grinding tool 12 rotates on a separate spindle. The spindle for grinding tool 12 is mounted on an air slide 14 movable along a y axis. A carriage Cy (FIG. 2) of y axis air slide 14 is coupled to a carriage Cx of an air slide 16 movable along an x axis. The air slides 14 and 16 are mounted on a rotary table 18. The grinding tool 12 can be positioned with respect to a predetermined reference, which may be the centerline of rotation C of the rotatable table 18, by linear movement of the carriage Cy by means of air slide 14 along the y axis, and by linear movement of the carriage Cx by means of air slide 16 along the x axis. In order to accurately operate the air slides along the x and y axis and position the carriages, linear actuators 20 and 22, respectively, move the carriages on the air slides 14 and 16 in small precise increments.

Sensors, such as the sensor 24, accurately determine the position of grinding tool 12. The outputs of the sensors may be applied to a computer controller 26 which controls the incremental actuators 20 and 22 and other components and operations of the machines.

Two independent air supplies 28 and 30 are provided to supply air to each air slide 14 and 16 (only one such set is shown in FIG. 1). A first supply of air 28 for each slide provides a thin film of air between the upper plate of the air slide and the center rail on which the plate rides, and is sufficient to overcome the force generated by the weight on the carriage plus the force generated by the second air supply 30 against the bottom plate. In an exemplary embodiment, the grinding tool 12 must be accurately located within one microinch of the center line axis of rotation C of rotary table 18. Once the tool is located, the first air supply is turned off, and the system is locked into position by means of the second air supply, with no movement due to the grinding forces. That is, the second air supply for each slide is maintained between the rail and the bottom plate to positively lock the top plate and rail in position when the first air supply is turned off, by the force exerted on the top surface of the bottom plate by the second air supply.

In accordance with the present invention, when the tool is precisely aligned with respect to the center line C of the rotary tube 18, the first air supply 28 for each air slide is stopped. Solenoid valves 32 and 34, which may be controlled by computer controller 26, provide means for selectively stopping the supply of air to the air slides and lock them in the position of precise alignment.

A nozzle 35 supplies a coolant and/or lubricant liquid to the grinding surface of the mold during grinding. The presence of this liquid gives rise to the problem of wicking of some of the liquid into the air slide.

Figure 5:
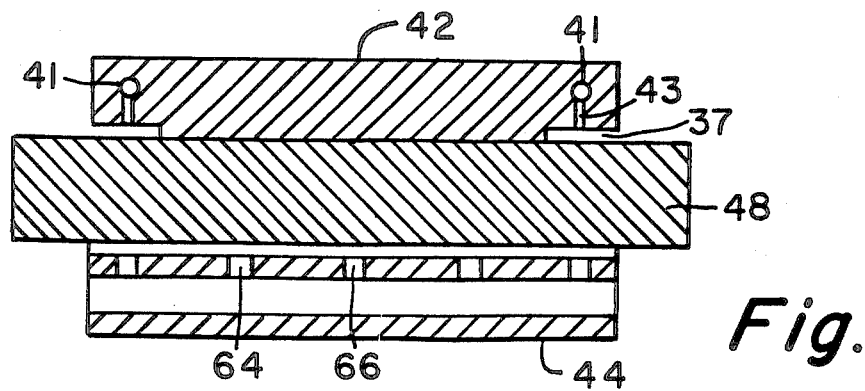
FIG. 5 is a section through an air slide carriage and center rail.
Figure 7:
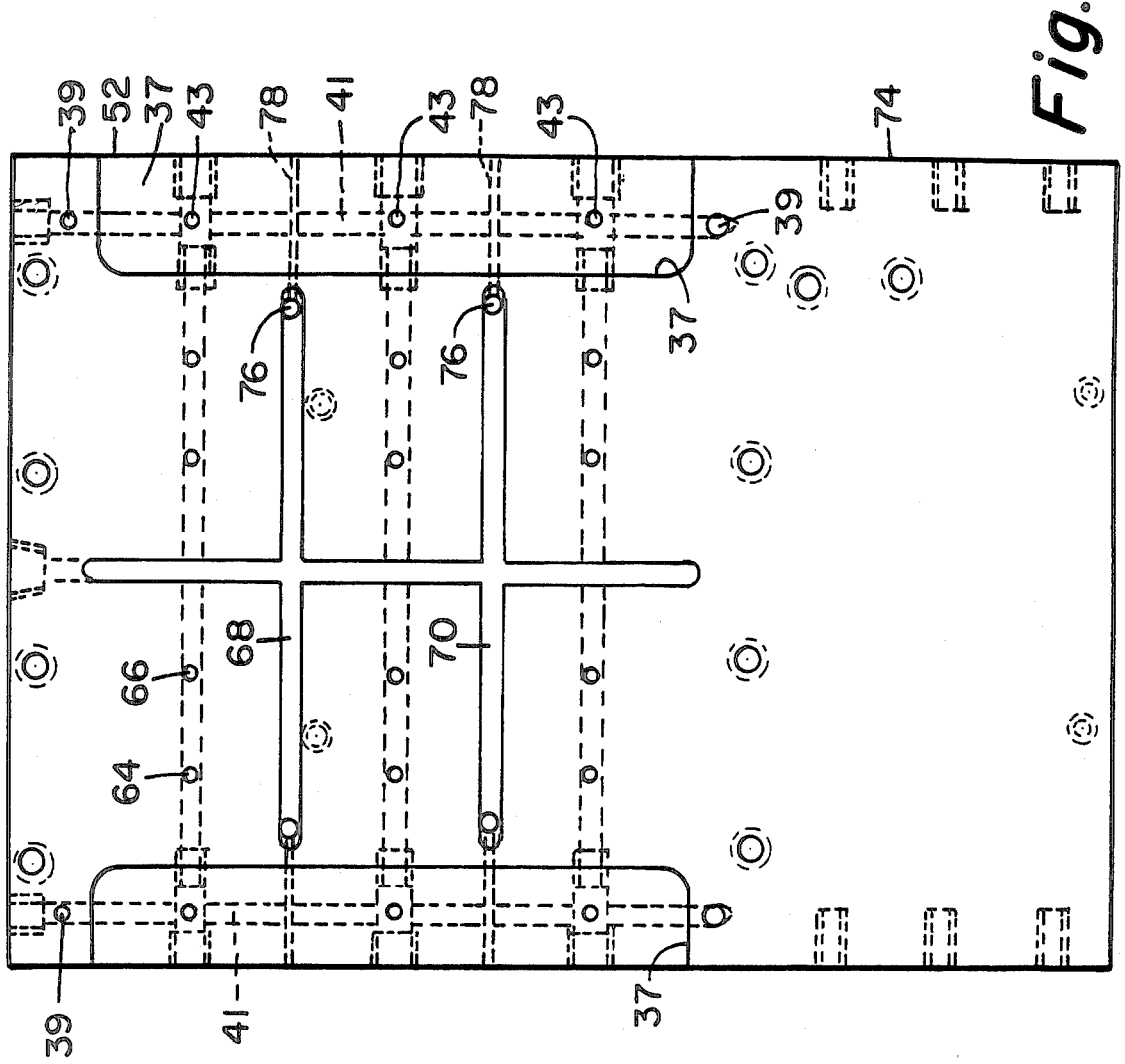
FIG. 7 is a plan view of the top plate.
Figure 6:
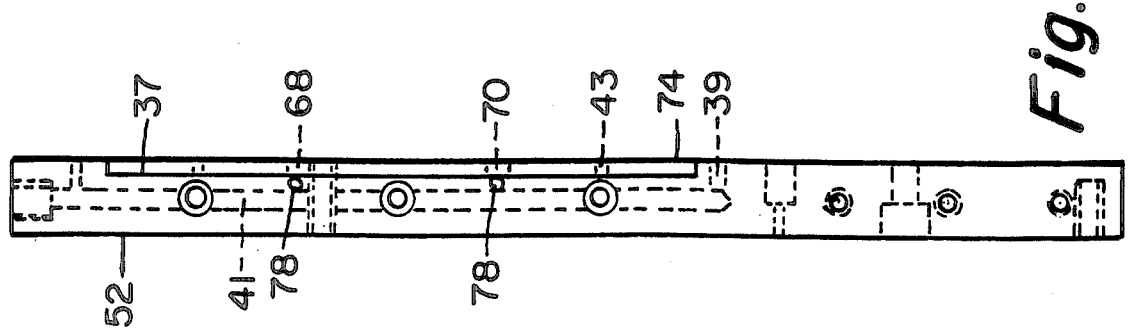
FIG. 6 is an end view of a top or upper plate for an air slide.

The wicking is solved by the present invention which includes a recess 37 formed in opposite front and rear ends of upper plates 42, 52 as is best shown in FIG. 5 and FIGS. 6 and 7, respectively. Air holes 39 and 41 are manifolded to the air supply of the side guides and bottom plate of each carriage. In the exemplary embodiment, the holes 39 and 41 are located approximately $\frac{3}{8}"$ from the front and rear edges of each upper plate, 42, 52. The holes 39 and 41 communicate with, and supply air to exit holes 43, which terminate in the upper surface of recesses 37, which surface lies in a plane that is about 0.010" higher than the clamping surface of the top plate. By introducing the clearance on the top plate, and manifolding the air holes to the air supply of the side guides and bottom plate, the air will always blow out on the front and rear ends of the top plate and thus prevent wicking about the top plate, even when the first air supply is shut off. With the 0.010" clearance for the recess 37 on the top plate, an air bearing will not be formed, and the air slide will remain locked in a fixed position, when the first air supply is shut off.

Figure 2:
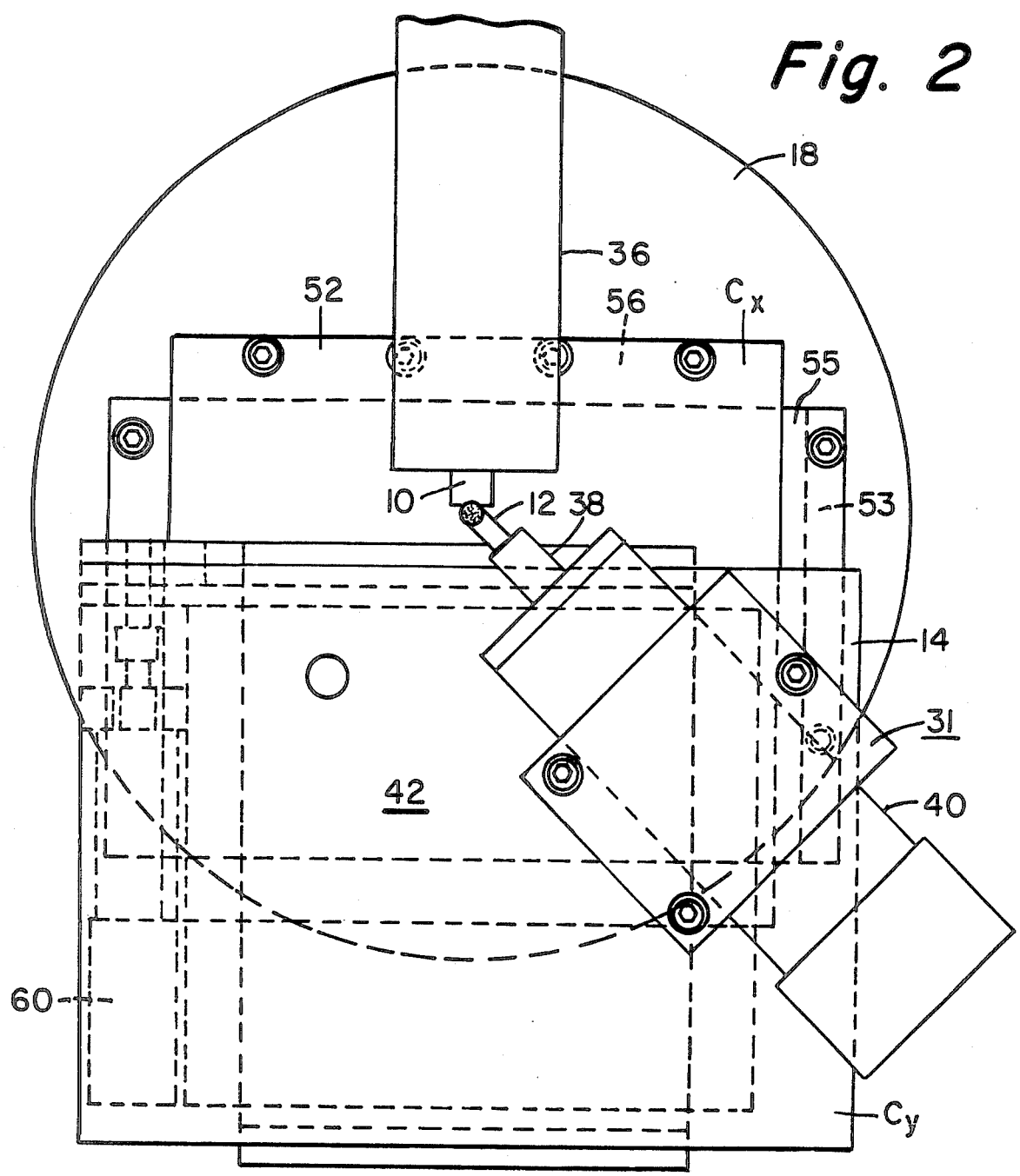
FIG. 2 is a top plan view of the machine.
Figure 3:
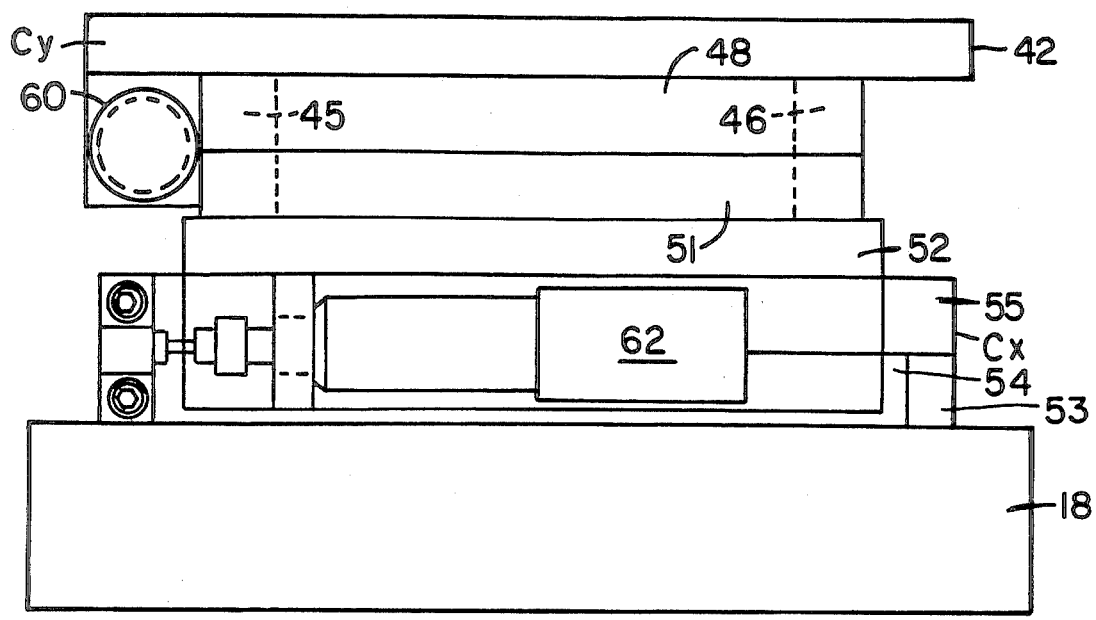
FIG. 3 is an end view of FIG. 2 with the spindle assembly omitted.
Figure 4:
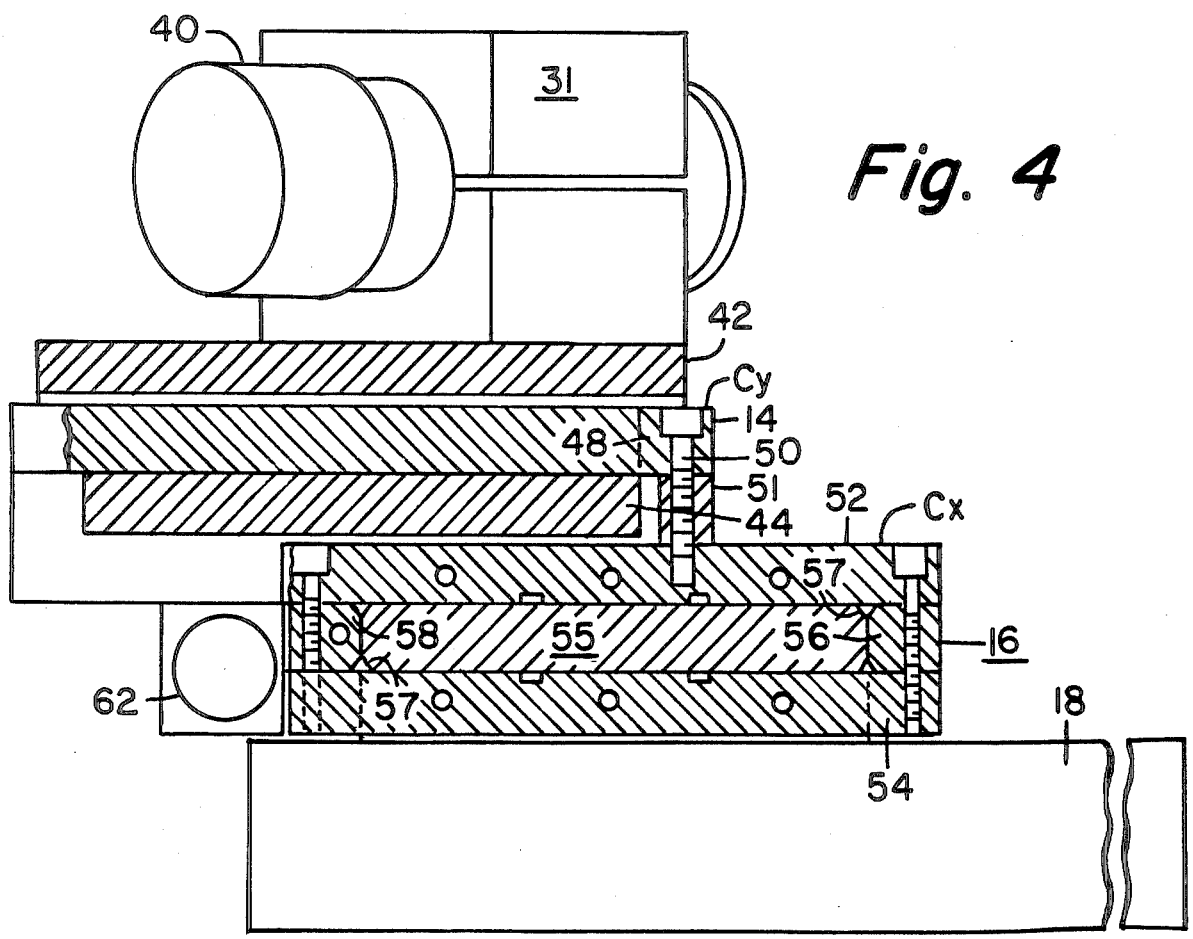
FIG. 4 is a side view, partially in section, of the machine of FIG. 2.

FIGS. 2–4 show further details of the machine of the present invention. Holder 10 is mounted on spindle 36 and grinding tool 12 is mounted on spindle 38. Spindle assembly 31, including spindle motor 40, is mounted on the carriage Cy of the y axis air slide 14. The carriage Cy of air slide 14 includes upper plate 42, bottom plate 44, and two side guides 45 and 46 (see FIG. 3). The carriage Cy moves linearly on a center rail 48. Center rail 48 is coupled to a carriage Cx of the x axis air slide 16 by means including bolt 50 and spacer 51. The carriage Cx includes an upper plate 52 and bottom plate 54 which slide on center rail 55, and side guides 56 and 58. Center rail 55 is mounted on table 18 through spacer 53. The side guides 45, 46 and 56, 58 maintain the lateral stability of the slides during positioning, and also permit the top plates to move downwardly upon the rails without a sidewise-lateral movement when the first air supply is turned off.

The carriage Cy of y axis air slide 14 rides on a thin film of air supplied between upper plate 42 and center rail 48 at a pressure sufficient to overcome the force generated by the weight on the carriage and the force exerted by air pressure from the second air supply 30. As previously mentioned, air is also continuously supplied from a second independent source (such as air supply 30 for each slide) to side guides 45 and 46 and bottom plate 44 of carriage Cy and to side guides 56 and 58 and bottom plate 54 of carriage Cx, thus preventing wicking along such guides and plates. During the independent positioning of each carriage (Cy, Cx), air flows between the surfaces of center rail (48,55) and the inner surfaces of upper and bottom plates (42,52) and (44,54) and the inner surfaces of the sides guides. First one tool axis is positioned over the center line C of the table 18, and then the other axis is so positioned. When each is so positioned, the first air supply is shut off to lock the slide in its set position.

When air is supplied between the upper plate 42 and the rail 48, the carriage Cy moves easily on the center rail 48. In an exemplary embodiment, an air pressure of approximately 50 psi was maintained over the surface of a top plate having dimensions of approximately $10" \times 7\frac{1}{4}"$. With this air pressure and flow, the carriage rode approximately 10 microinches above the rail. The carriage Cy is easily moved by means of linear actuator 60 along the y axis air slide 14, and by means of linear actuator 62 along the x axis air slide 16, which positions carriage Cx upon which carriage Cy is mounted. In an exemplary embodiment, these linear actuators are Burleigh Inchworm type linear actuators. These actuators move linearly in increments of 0.0000005" (one half millionth of an inch). The linear actuators 60 and 62 can be computer controlled.

FIGS. 6 and 7 show the upper plate 52 of the x axis air slide. Air holes 64, 66 and others, which may be manifolded by passages in the side guides, each supply air to the inner surface 74 of the plate, which adjoins the center rail 55. The location of the air holes is chosen so that the boundary area over which air flows from each hole overlaps with the adjoining boundary area. In this way, the entire surface of the plate is supported by a thin film of air. This air flows to the grooves 68 and 70 through which the air escapes to atmosphere via passages 76, 78 to the edge of the plate. It is understood that upper plate 42 of the y axis air slide, and bottom plates 44, 54 respectively of the y an x air slides, also are provided with similiar air holes and grooves, as well as the side guides 45, 46, 56, 58. In fact, the side guides may be beveled, such as shown at 57 (FIG. 4) to facilitate the venting of air to the atmosphere.

While a particular embodiment of the invention has been shown and described, various modifications are within the true spirit and scope of the invention. The appended claims are, therefore, intended to cover all such modifications.

What is claimed is:

1. In a machine for shaping a workpiece, said machine having a tool and a holder for said workpiece, an improved air slide for precisely determining the relative position between said tool and a predetermined reference comprising:
- a center rail;
- a carriage mounted for linear travel on said rail, one of said tool and said holder being mounted on said carriage, said carriage being formed by an upper plate, two side guides and a bottom plate;
- means for supplying a thin film of air between said center rail and said carriage so that said carriage can be moved linearly on said rail for precise alignment between said tool and said reference;
- recesses formed in opposite ends of said upper plate on the side adjoining said rail, air holes in said upper plate communicating with said recesses; and
- means for selectively discontinuing a portion of said air supply necessary to move said carriage on said rail and for independently supplying air to said holes communicating with said recesses, and for flowing air outwardly from said recesses sufficient to prevent foreign material from entering said air slide.

2. The machine recited in claim 1 wherein the top of each of said recesses has a clearance above said rail sufficient to prevent the pressure of the air supplied to said recesses from forming an air bearing for said slide.

3. The machine recited in claim 1 wherein said upper plate, side guides and bottom plate have air holes to which air is supplied; and
- two independent air supplies, including a first air supply for said upper plate to supply said thin film of air between said center rail and said carriage so that said carriage can be moved linearly, and a second air supply continuously manifolded to the air holes in said side guides, bottom plate and recesses in said upper plate.

4. The machine recited in claim 3 further comprising means for selectively stopping the first air supply forming said thin film between said center rail and said carriage while maintaining said second air supply to lock said carriage on said rail in a position of alignment and for preventing wicking between said carriage and said center rail.

5. The machine recited in claim 1 further comprising:
- two of said improved air slides for providing relative movement in two orthogonal directions between said tool and said reference and the carriages of said two air slides being coupled one to the other.

6. The machine recited in claim 5 further comprising:
- linear actuators for moving the carriages of said air slides, said linear actuators moving said carriages in small precise increments.

7. The machine recited in claim 6 wherein said holder is at said predetermined reference when said machine is in operation.

8. The machine recited in claim 7 further comprising:
- a computer controller for controlling said linear actuators to position said grinding tool with respect to said reference.

9. The apparatus recited in claim 8 further comprising:
- solenoid actuated valves between said means for supplying air and said air slide, said computer controller controlling said solenoid valves to lock said air slide in the position of precise alignment.

10. an improved air slide for precisely determining the relative position between a tool and a predetermined reference comprising:
- a center rail;
- a carriage mounted for linear travel on said rail, one of said tool and said predetermined reference being mounted on said carriage, said carriage being formed by an upper plate, two side guides and a bottom plate;
- means for supplying a thin film of air between said center rail and said carriage so that said carriage can be moved linearly on said rail for precise alignment between said grinding tool and said holder; and
- a groove in said top plate adjacent the periphery thereof on the side adjoining said rail, air holes in said top plate extending into said groove; and
- means for discontinuing a portion of the air supply necessary to move said carriage on said center rail and for independently supplying air to said holes in said groove, the flow of said air being sufficient to prevent foreign material from entering said air slide.

11. The improved air slide recited in claim 10 wherein the top of said groove has a clearance above said rail sufficient to prevent the pressure of the air supplied to said holes in said groove from forming an air bearing for said slide.

12. The improved air slide recited in claim 10 wherein said upper plate, side guides and bottom plate have air holes to which air is supplied; and
- two independent air supplies, one for said upper plate to supply said thin film of air between said center rail and said carriage so that said carriage can be moved linearly, and one air supply connected to the air holes in said side guides, bottom plate and groove in said upper plate.

13. The improved air slide recited in claim 12 further comprising:
- means for selectively stopping the supply of air forming said thin film between said center rail and said carriage to lock said carriage on said rail in a position of alignment.

14. The improved air slide recited in claim 10 and another of said air slides coupled to it, said two air slides providing relative movement in two orthogonal directions between the tool and said reference.

15. An improved air slide having means for preventing the ingress of foreign material therewithin when in a desired position which comprises:
- a center rail;
- a carriage movable along said center rail;
- said carriage including an upper surface portion above said center rail, a lower surface portion below said center rail, and side portions extending between said upper and lower portions;
- said upper portion including recess means in communication with said rail adjacent each edge of said upper portion extending between said side portions;
- means for supplying air between said carriage and said center rail for facilitating the movement of said carriage to a desired position on said rail;
- and means for discontinuing a portion of said supply of air when said carriage is in a desired position on said rail while maintaining a supply of air to said recess means sufficient to prevent the ingress of foreign material into said air slide.

16. An improved air slide as defined in claim 15 wherein said means for maintaining a supply of air between said carriage and said rail sufficient to prevent the ingress of foreign material into said air slide includes said recess means adjacent each said edge through which a portion of said air supply exits to the atmosphere thus preventing foreign material from entering said air slide.

17. An improved air slide as defined in claim 15 wherein said means for maintaining a supply of air between said carriage and said rail sufficient to prevent the ingress of foreign material into said air slide includes a plurality of passage means formed in said carriage for continuously flowing air between said rail and said carriage for egress to the atmosphere and preventing foreign material from entering said air slide.

18. An improved air slide as defined in claim 15 wherein said means for supplying air between said carriage and said center rail includes a plurality of passage means formed in said carriage, said passage means including outlets formed in inner surfaces of said carriage adjacent said rail, and said outlets being spaced so that the boundary area over which air flows from each outlet overlaps with the adjoining boundary area from an adjacent outlet.

* * * * *